United States Patent
Taft et al.

[11] 3,802,678
[45] Apr. 9, 1974

[54] METAL-MELTING FURNACES

[75] Inventors: Richard Thomas Taft, Bromsgrove; Thomas Henry Taft, West Hagley, both of England

[73] Assignee: Hayes Shell-Cast (Developments) Limited, Stourbridge, Worcestershire, England

[22] Filed: Jan. 26, 1972

[21] Appl. No.: 220,811

[30] Foreign Application Priority Data
Feb. 1, 1971 Great Britain.................. 3627/71

[52] U.S. Cl.................................. 266/25, 266/33 R
[51] Int. Cl............................................. F27b 1/08
[58] Field of Search.................... 266/25, 33 R

[56] References Cited
UNITED STATES PATENTS

| | | |
|---|---|---|
| 3,418,108 | 12/1968 | Von Stroh .................. 266/25 |
| 924,025 | 6/1909 | Wilshire .................. 266/25 |
| 3,338,707 | 8/1967 | Carli et al. .................. 266/25 |
| 2,161,180 | 6/1939 | Marx .................. 266/25 |
| 3,253,906 | 5/1966 | Secord .................. 266/25 |

*Primary Examiner*—Gerald A. Dost
*Attorney, Agent, or Firm*—Scrivener Parker Scrivener & Clarke

[57] ABSTRACT

A cupola-type metal-melting furnace, primarily for melting iron for foundries, is run on a fluid fuel and without coke, using a fuel/air mixture at least 10 percent rich in fuel and with combustion outside the furnace shaft; the hot combustion gases pass up the shaft through a heat-exchange bed of refractory material, and the metal charge above the bed melts and is superheated at it passes down through the heat-exchange bed.

3 Claims, 4 Drawing Figures

METAL-MELTING FURNACES

This invention relates to a process for melting metal, primarily but by no means exclusively iron and its alloys, and to a cupola furnace fired by fluid fuel (gas, liquid or powdered solid) for carrying out this process.

In a cupola furnace used for melting iron for used in foundries the furnace is charged with a mixture of scrap iron or pig iron and coke, and a blast of air from tuyeres distributed around the base of the furnace results in combustion of the coke sufficient to melt and superheat the iron, which falls to the bottom of the furnace and collects in a well from which it is tapped off.

As the coke becomes poorer in quality and higher in cost attempts have been made in recent years to find alternative ways of melting iron in commercially practical quantities. Quite apart from the cost and the poor quality of coke, additional reasons for wanting to eliminate it are the fact that it can lead to pick-up of sulphur in the iron, which has a very adverse effect on the quality of the iron, and the fact that the sulphur compounds in the products of combustion of existing coke-fired cupola furnaces can cause serious atmospheric pollution by sulphur dioxide in addition to accompanying grit and dust.

Some success has been obtained in the U.S.S.R. and in Belgium with the firing of iron-melting furnaces with gas. In the Belgian proposal a reverbatory fore-hearth or fore-chamber was arranged alongside the foot of a vertical shaft furnace and a flame from a gas-burner played on the surface of the pool of molten metal in this fore-hearth, which could tilt for pouring purposes, while the hot gases passed from the fore-hearth into the shaft of the furnace. In the Russian proposals the burners are mounted directly on the shaft furnace, which has staggered internal shoulders to prevent the unmelted metal charge falling to the bottom. Other proposals have been made in which oil-firing or gas-firing is employed as an auxiliary source of heat in a cupola furnace allowing a reduction, but not the elimination, of the quantity of coke required.

The aim of our invention is to provide a continuous process of melting metal, primarily iron for foundry use, in a shaft furnace without the use of coke and producing a product at least as good as, and generally better than, that produced by an existing cupola furnace.

According to the invention there is proposed a process for melting a charge of metal in a vertical or substantially vertical shaft furnace comprising placing the metal charge in an upper zone of the shaft above a porous heat-exchange bed of refractory material that is substantially non-reactive towards the metal in the molten state of the latter, and blowing laterally into a lower zone of the shaft, below the level of the bed, the hot gaseous products of combustion of at least one burner operating on a gaseous, vaporised liquid or powdered solid fuel under controlled fuel-rich conditions outside the shaft itself, whereby the hot gaseous products pass upwards through the heat-exchange bed, heating the latter and emerge from the upper surface of the bed still hot enough to melt the metal of the charge, which metal, on melting passes downwards through the bed, in which it picks up additional heat so as to be superheated above its melting point, and passes downwards to a still lower zone of the shaft, from which it is removed.

Preferably the burner or each burner is operated with a fuel/air mixture which is at least 10 percent rich in fuel, and in typical practice is 20 percent rich. This minimises oxidising conditions within the furnace. It does not produce the most efficient combustion in terms purely of thermal efficiency but the invention is based on appreciation that thermal efficiency is not the most important thing. On the contrary, by using a rich mixture to ensure a controllable degree of reducing conditions, without worrying about thermal efficiency, we ensure optimum process efficiency in the production of high-quality molten metal at a temperature adequate for direct use in the foundry without further reheating.

The molten metal can collect in a well forming the bottom of the furnace, from where it is tapped off either continuously or intermittently, as required, through a suitable tap hole.

Although we preferably employ gas (natural gas, town gas or LPG) as the fuel, it will be understood that substantially the same results can be obtained using vaporised liquid fuels, such as fuel oil and with burners of appropriate design and construction, with a fuel in the form of a finely divided solid, blown in and behaving like a fluid.

Also according to the invention there is proposed a furnace for carrying out the method described above comprising a vertical or substantially vertical refractory-lined shaft furnace having an upper charging zone to receive a metal charge to be melted, an intermediate zone containing a heat exchanger bed in the form of an openwork structure of refractory material substantially inert to the metal to be melted, and a lower zone, immediately below this intermediate zone, into which is directed laterally at least one burner for a fluid fuel (gas, vaporised liquid or powdered solid) mixed with air, arranged so that combustion takes place entirely outside the shaft and the hot gases of combustion enter the shaft and pass upwards through the heat exchanger bed.

Where there are two more burners, they should be radially disposed, and evenly spaced apart around the shaft, all pointing towards the centre of the shaft, and they may be tilted slightly downwards from the horizontal.

The heat exchanger bed may be in the form of an open checquer-brick structure which is self-supporting and spans the shaft and is a rigid construction. However, we prefer to use loose refractory bodies, for example balls of clay- or tar-bonded carbon or graphite having a diameter typically between 7½ percent and 15 percent of the mean diameter of the shaft and supported on a grid, which can be in the form of at least two water-cooled bars extending across the furnace. It will be understood that the volume of the heat exchanger bed will depend on the desired melting capacity of the furnace but generally speaking the bed should have a depth of not less than one foot (30cm) or more than three feet (90cm) and in practice we prefer to have a depth of about two feet (60cm). The burners can enter the shaft about two feet (60cm) below the bottom of the bed.

The invention will now be further described with reference to the accompanying drawings, which illustrate an example of a gas-fired cupola furnace according to the invention and in which.

Figure 1:
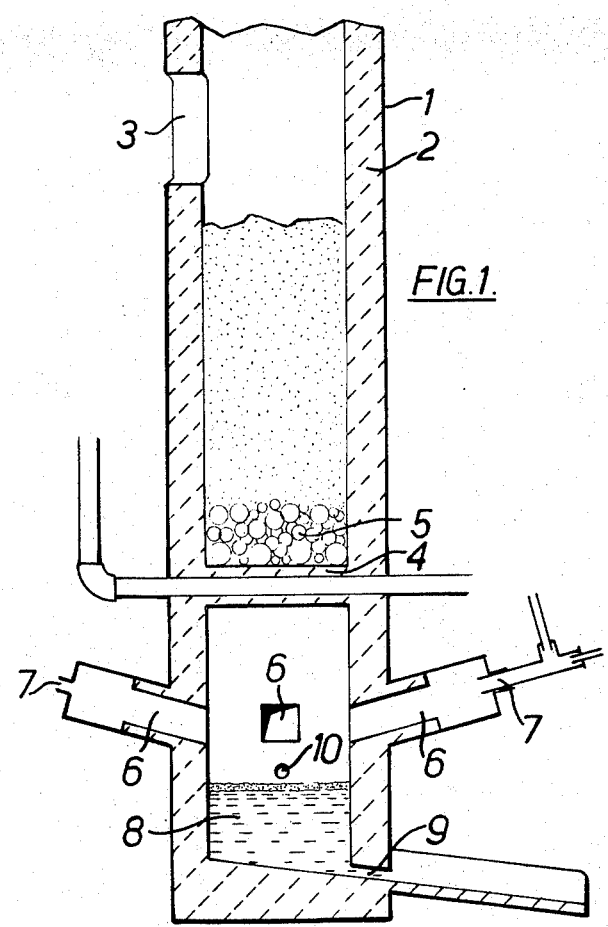
FIG. 1 is a diagrammatic vertical section through the axis of the furnace.
Figure 3:
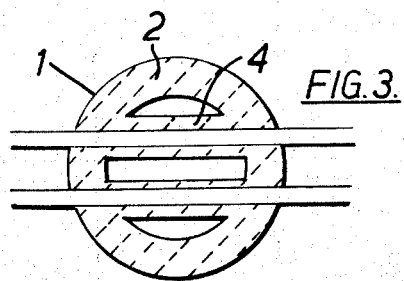
FIG. 3 is a diagrammatic horizontal section through the bars that support the heat-exchanger bed, with the tuyeres not shown.

Basically the furnace is similar to a coke-fired cupola furnace in that it comprises a vertical cylindrical steel casing 1 of circular cross-section lining with refractory material 2. Although shown as being of circular cross-section it could have a different shape, even square. There is a charging door 3 for the admission of charge material, and the upper end leads to a flue (not shown).

The bottom end of the furnace is shown permanently closed but in practice it may be in the form of a pair of hinged doors which can be opened for access when the furnace is being relined.

About five feet (180cm) from the bottom of the shaft there is a supporting grid formed by two horizontal parallel hollow steel bars 4 covered with refractory material. Cooling water is passed through them during operation of the furnace. Resting on these bars is a bed 5 of highly refractory material in the form of loose spherical balls such as clay-bonded graphite. In the example shown the internal diameter of the shaft at this point is forty inches (1 metre) and the balls are five inches (12½cm) in diameter. For a bigger furnace the balls may be bigger, but preferably with an upper limit of seven or eight inches and in practice the diameter of the balls will generally lie in the range between 7½ percent and 15 percent of the mean diameter of the shaft.

Other materials may be used for the heat exchanger bed provided they are sufficiently refractory to withstand the temperature arising. As the purpose of the bed in addition to supporting the unmelted charge materials, is to act as a heat exchanger the material should have a high thermal capacity and a high emissivity. It must not react readily or to a sufficient extent with the metal being melted and preferably it should not be 'wetted' by the molten metal. Instead of balls one could use other shapes, even broken lumps of refractory material in the form of scrap from some other process provided their shape and arrangement is such that they allow the passage of the required volume of gas, but at the same time they provide a sufficient length of path and time of contact for the descending metal droplets to pick up sufficient superheat.

The optimum depth of the bed will depend on various factors, including the diameter of the shaft and the temperature to be obtained. In the example shown it is two feet (60cm).

Two feet below the bars 4 there is a ring of four combustion chambers 6, symmetrically arranged and each pointing radially inwards as viewed in plan, and tilted slightly below the horizontal (ten degrees in the example shown) in elevation. At the outer end of each combustion chamber there is a gas burner 7, which can be of known commercially available construction to which gas and air are fed. Combustion takes place entirely within the chamber, which can be of any suitable shape in cross-section and must have adequate volume to ensure complete reaction of the available oxygen content in the combustion air.

The flow of gas and of air to each individual burner is independently controlled and adjusted to a value such that the ratio of gas to air is at least ten percent, and preferably upwards of twenty percent, greater than the theoretically correct value given by stoichiometric considerations. This ensures that there is a less oxidising or even a reducing atmosphere in the furnace shaft.

At the foot of the furnace is a well 8 in which the molten metal collects, and it can be tapped off continuously or intermittently, as and when required, through a pluggable tapping hole 9. Another hole 10 at a higher level allows slag, which floats on the molten metal, to be tapped off from time to time as it builds up. In an alternative arrangement (not illustrated) any of the known systems for the continuous and simultaneous removal of metal and slag could be used.

The furnace described is for melting iron for iron-casting foundries. It is charged with a mixture of pig iron, scrap iron and scrap steel in accordance with usual cupola practice, but of course no coke. There is addition of typically one percent of limestone as a flux or there could be more, depending on the quality of the charge materials.

The gases of combustion from the combustion chambers 6 meet in a central lower zone of the shaft, below the bars 4 and pass upwards, heating the refractory bed 5 and thence they pass up into the charge materials. It will be appreciated that the iron will not melt unless the gas temperature above the bed 5 is above the melting points of the charge materials, which range from 1,150°C to approximately 1,500°C when melting iron. Therefore the ambient temperature lower down in the bed is still higher, and just below the bed of the estimated gas temperatures are around or a little above 1,600°C. The charge materials already molten at the top of the bed, in trickling down through the bed of refractory material, pick up additional heat from the bed (which is itself being continuously heated by the gases) and emerges at the bottom of the bed considerably superheated above the melting point of the now substantially mixed molten material. It then falls past the lower zone containing the combustion chambers and into the well, from which it is tapped off for use.

In the example described the bars 4 are five feet (150cm) above the floor of the well 8 and the combustion chambers 6 open into the shaft two feet (60cm) below the bars. The heat exchanger bed is two feet (60cm) thick and the depth of the charge material can be varied over wide limits. In the example shown the depth of charge material can be up to six feet (1.8 metres) which is the distance from the top of the heat exchanger bed to the sill of the charging door. The greater the depth of charge, the greater is the degree of preheating and therefore the higher the amount of heat extracted from the gases giving a higher efficiency, but overall thermal efficiency based on maximum flame temperature heat release is not a primary aim of the invention.

The burners in the example described each have a rated thermal capacity of 3 million B.Th.U. (756,000 Kcal.) per hour but are operated at about 80 percent of their maximum throughput of gas which gives a rated 2½ million B.Th.U. (600,000 Keal.) per hour. The actual quantity of heat generated is less than this as the burners are fed with a fuel-rich gas/air mixture to the extent of 20 percent of excess gas. From 30 percent to 40 percent of the heat generated is transferred to the metal as latent heat of fusion and subsequent superheating of it as the melting rate is raised from 3 to 4½ tons of metal per hour. It will be understood that all the values and dimensions given above and the number of burners can be altered to give greater or smaller melting capacities.

Figure 4:
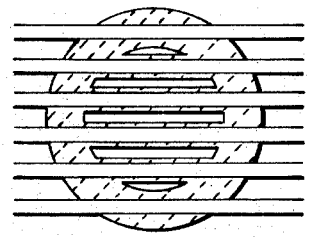
FIG. 4 is a section similar to that of FIG. 3 but showing a modification.

The hollow bars 4 need not be covered with refractory material if the flow of cooling water is high and if steps are taken to ensure that the flow will not be interrupted, even momentarily. In a modification, shown in FIG. 4, the number of bars is increased to six, of which the outer two are initially wholly embedded in the refractory lining of the shaft but become exposed as the lining wears away in use. These bars serve to reduce the rate of erosion of the refractory lining and so as to the period of service of the lining before repair or replacement is required.

The material of the refractory bed 5 is consumed very slowly in use at a typical rate of 2 percent or appreciably less, of the weight of iron melted, and so the furnace can be run for long periods before the bed needs to be completely renewed. The bed can be maintained at its working depth by adding bed material to the in-going charge materials at a rate of one or two percent of the weight of metal charged.

The elimination of coke results in iron free from the consequential problem of sulphur pick-up, and the sulphur content of the iron will certainly be no higher than that of the pig and scrap materials charged. The changes in silicon content have been found to be negligible in the process according to the invention, in comparison with melting in a coke-fired cupola. The changes in carbon content of the iron are affected by the absence of the coke that would be present in a coke-fired cupola. In the coke-fired cupola the coke is capable of actually increasing the amount of carbon in the molten metal over the mean carbon content of the charged materials. In the gas-fired cupola we find there is about 0.5 percent less carbon in the molten metal, for a given charge composition than in the coke-fired cupola. This can be allowed for by altering the proportions of the different constituents in the charge material.

Figure 2:
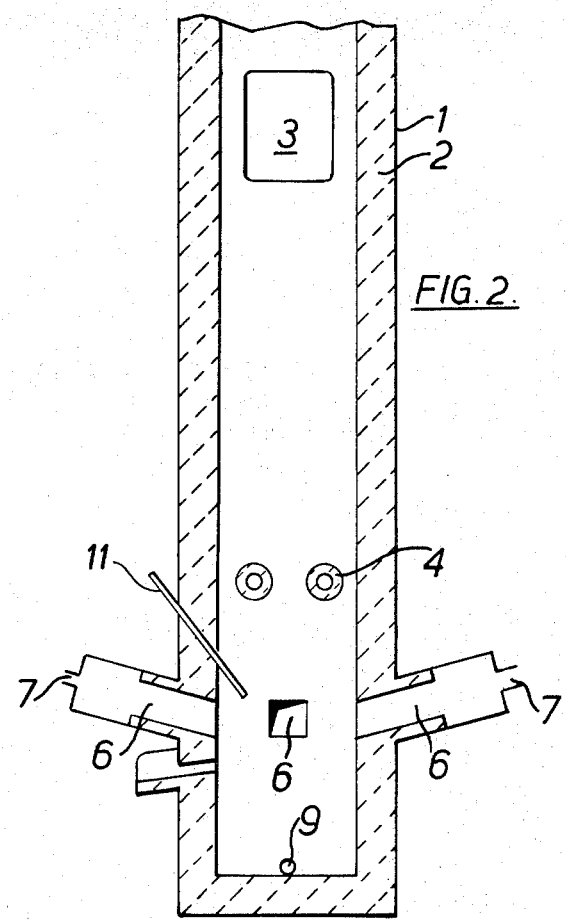
FIG. 2 is another vertical section through the axis, taken in a plane perpendicular to that of FIG. 1.

Alternatively we can add carbon by introducing it in the form of powdered graphite, or a commercially available re-carburising composition, which is blown into the pool of molten metal by a blast of dry gas entering the furnace through a pipe 11, (see FIG. 2), which may be of metal, or refractory-coated metal or refractory material, inserted in the wall above the level of the burners. Preferably the pipe is inclined downwards so that the falling droplets of metal and slag will not accumulate and freeze over its outlet, and so that the powdered graphite is driven by the gas blast below the surface of the liquid metal in the well.

It is known that the temperature of the molten iron will be reduced by about 70°C for each one percent of carbon added. Therefore if we add ½ percent or 1 percent of carbon to the iron the temperature of the iron measured in a ladle into which it has been tapped from the furnace, will be less than that if no carbon were added, and it will also have lost about 30° or 40°C between the furnace and the ladle. Thus, as we find the temperature measured in the ladle to be generally between 1,350° and 1,430°C, and mostly between 1,385° and 1,410°C, it can be deduced that, in the absence of carburisation, the temperature of the metal in the well must be between 1,450°C and 1,520°C. The temperature higher up in the furnace may be 1,600°C below the heat exchanger bed and not more than 1,550°C.

The above results were obtained with the gas/air mixture 20 percent in gas, and with cold air. If we increase the richness to 30 percent or 35 percent, still with unheated air, the temperatures in the furnace are lower. Also the combustion chambers have to be greatly enlarged in order to ensure that all the free oxygen in the combustion gases is consumed before the gases reach the vertical shaft of the furnace itself. With such rich mixtures it is advisable to pre-heat the ingoing air, in order to keep up th combustion temperature, and thereby keep the temperature within the furnace to a level that will ensure melting and superheating of the charge. The pre-heating may be done by passing the ingoing air heated by the waste gases from the furnace flue. Alternatively, where the gas mixture is sufficiently fuel-rich, the waste gases may themselves be combustible and can be burnt to provide heat for pre-heating the in-going air. For such conditions the richness may be increased up to 100 percent i.e., we could feed to the burners twice as much gas, in proportion to air, as would be theoretically correct for perfect combustion.

As well as carbon, other constituents could be added to the molten metal in the well, for example magnesium or nickel, either in the form of the commercially pure metals, or in the form of alloys or compounds. This addition as alloys achieves more effective alloying of the additive with the iron and eliminates objectionable side reactions which could contaminate the atmosphere. The absence of coke and of uncontrolled slag in the process according to the invention ensures that these additions take place predictably and consistently.

By the overall process according to the invention not only is an improved product obtained, but also, as mentioned earlier, a particularly valuable added virtue is the sulphur-free and smoke-free emission from the flue; this emission eliminates pollution and is virtually invisible.

We claim:

1. A fluid-fuel-fired cupola metal-melting furnace for carrying out the invention set forth, comprising a substantially vertical shaft having upper, intermediate and lower zones and a well at the bottom of said shaft below said lower zone, means for admitting metal charge materials to said upper zone, a porous refractory substantially non-consumable non-reactive heat-exchange bed extending across said intermediate zone to substantially occupy said zone, said bed being not less than one foot thick in a vertical direction, and said bed comprising loose refractory bodies resting on a water-cooled grid, said bodies being substantially spherical and having diameters between 7½ percent and 15 percent of the mean horizontal dimension of said shaft, at least one combustion chamber, said combustion chamber opening directly into said shaft in said lower zone thereof, wholly below said bed and above said well, a burner in said combustion chamber fired by air and fluid fuel, said combustion chamber and burner being of relative sizes such that combustion from said burner takes place in said chamber and clear of said shaft, and said bed being sufficiently porous to allow the products of combustion from said burner to pass upwards therethrough, heating said bed, and to pass thence into said upper zone to form the sole means of melting metal in said upper zone.

2. A process for melting a charge of ferrous metal in the shaft of a vertical cupola furnace having a well at the lower end thereof, said process comprising the steps of burning a fluid-fuel/air mixture in a plurality of burners in respective combustion chambers which are wholly outside said shaft under conditions whereby said fuel is at least ten percent rich in relation to said air as compared with the stoichiometric ratio, admitting the products of combustion from said combustion chambers directly into said shaft at an intermediate level thereof above the level of said well, said intermediate level being open and free of solid matter, allowing said products to flow upwards through a distance of not less than two feet in a region within said shaft above said intermediate level and free of solid matter, allowing said products to flow further upwards through a porous heat-exchange bed comprising a stack of loose individual refractory bodies of inert carbonaceous material, non-wetting to molten iron, said stack resting on supporting bars disposed above said region and being not less than one foot in vertical thickness, whereby said products impart heat to said bed, admitting a charge of ferrous metal to said shaft above the level of said bed, causing said metal to be melted substantially solely by the heat of said combustion products from said combustion chamber after said products have passed through said bed, whereby said molten metal trickles by gravity downwards through said porous bed in counter-current to said upwardly flowing products, said molten metal being thereby heated above the melting temperature thereof and thence passing by gravity through said intermediate level to said well, and withdrawing said molten metal from said well.

3. A fluid-fired cupola metal-melting furnace for carrying out the invention set forth, comprising a substantially vertical shaft having upper, intermediate and lower zones and a well at the bottom of said shaft below said lower zone, means for admitting metal charge materials to said upper zone, a supporting grid, said grid being disposed in said intermediate zone, a porous stack of loosely piled individual substantially non-consumable refractory bodies resting on said grid, said bodies being of an inert carbonaceous material which is non-wetting to molten iron, and said stack being not less than one foot thick in a vertical direction, a plurality of combustion chambers, each of said combustion chambers opening into said shaft in said lower zone thereof at a point not less than two feet below said grid, but above said well, a burner in each of said combustion chambers, fired by air and fluid fuel, said combustion chambers and burners being of relative sizes such that combustion from said burner takes place in said chamber and clear of said shaft, and said bed being sufficiently porous to allow the products of combustion from said burners to pass upwards therethrough, heating said bed, and to pass thence into said upper zone to form the sole means of melting metal in said upper zone.

* * * * *